ALWYN A. de SOUZA
INVENTOR
BY
BUCKHORN, BLORE, KLARQUIST & SPARKMAN
ATTORNEYS

United States Patent Office 3,353,066
Patented Nov. 14, 1967

3,353,066
SURGE PROTECTION CIRCUIT
Alwyn A. de Souza, Goleta, Calif., assignor to Joslyn Mfg. and Supply Co., Chicago, Ill., a corporation of Illinois
Filed Sept. 17, 1965, Ser. No. 488,006
6 Claims. (Cl. 317—31)

The subject matter of the present invention relates generally to high voltage surge protection circuits and more specifically to surge protection circuits for use with D.C. power supplies and D.C. load circuits, which includes a high voltage protection means actuated by voltages above a first predetermined voltage and a low voltage protection means actuated by voltages above a second predetermined voltage lower than such first voltage.

In one embodiment of the present invention the low voltage protection means includes a controlled semiconductor rectifier and a conventional semiconductor diode connected in parallel but of opposite polarity to provide an inexpensive, low voltage protection device capable of handling large currents and of extremely fast response. The high voltage protection device may be a spark gap enclosed in an envelope containing a rare or noble gas at atmospheric or subatmospheric pressure with radioactive prompting and a low work function material coated on the spark gap electrodes to provide a more uniform breakdown voltage and a faster response. In addition, the present protection circuit also includes a relay or other switch whose normally closed contacts and solenoid winding are connected in series with one of the power lines of the D.C. system, or a pair of relays in series with both the spark gap and the controlled rectifier devices to actuate such relay and open its contacts when either of such devices is rendered conducting in order to return such devices to a nonconducting condition.

The surge protection circuit of the present invention is especially useful in the D.C. voltage systems used in aircraft and railroad diesel locomotives. It has several advantages including a small size and inexpensive but reliable construction. In addition, by employing separate high voltage and low voltage protection devices, the present surge protection circuit is more efficient in operation, of greater current capacity and has a faster response than conventional circuits of this type. Furthermore, the present surge protection circuit employs an oscillation suppressor network which reduces signal reflections and reduces the amplitude of transients transmitted to the load when the high or low voltage protection devices or the relay is rendered conducting or nonconducting.

It is therefore one object of the present invention to provide an improved high voltage surge protection circuit which is compact and relatively inexpensive.

Another object of the invention is to provide an improved surge protection circuit of fast and reliable operation which is capable of handling large currents.

A further object of the present invention is to provide an improved surge protection circuit for a D.C. power system, in which separate high voltage and low voltage protection devices are employed for more efficient and economical operation, and such low voltage protection device includes a controlled semiconductor rectifier connected in parallel with but opposite in phase to a conventional semiconductor diode across the power lines of such system, so that such diode is normally reverse biased nonconducting and such controlled rectifier is not sufficiently forward biased to be rendered conducting.

An additional object of the present invention is to provide a surge protection circuit for a D.C. power system, which employs separate high and low voltage devices and such high voltage device is a spark gap containing a gas at atmospheric or subatmospheric pressure with radioactive prompting and a low work function material coated on the spark gap electrodes to provide a more uniform breakdown voltage and a faster response.

Still another object of the present invention is to provide an improved surge protection circuit in which a relay or other switch is energized in response to the conduction of either a gas filled spark gap device or a controlled rectifier device when such devices are rendered conducting by a high voltage surge, in order to automatically return such devices to their quiescently nonconducting conditions after the surge terminates.

Other objects and advantages of the present invention will be apparent from the following detailed description of preferred embodiments thereof and from the attached drawings of which:

Figure 1:
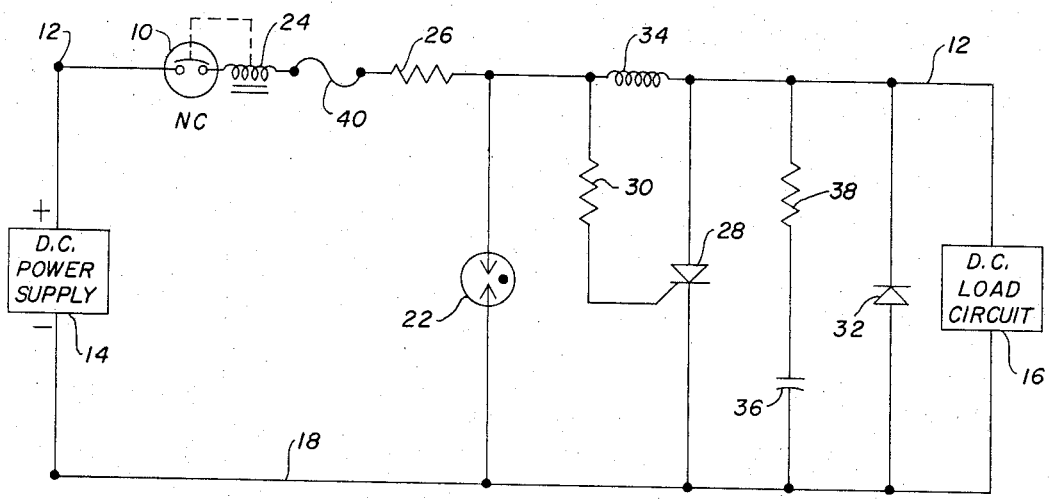
FIG. 1 is a schematic diagram of one embodiment of the present invention.

As shown in FIG. 1, one embodiment of the present invention includes a solenoid actuated switch or relay 10 which may be in the form of a vacuum switch such as shown in United States Patent 3,161,749 by J. T. Perry et al. The normally closed contacts of such relay are connected in series with a conductor line 12 which is connected to the positive terminal of a D.C. voltage source 14 of about 28 volts. The power supply 14 is connected to D.C. load circuit 16 through conductor line 12 and a second conductor line 18 connected to the negative terminal of such power supply, which may be grounded.

A high voltage discharge device 22 which may be a spark gap within an evacuated envelope containing a small amount of rare or noble gas at atmospheric or subatmospheric pressure is connected between the positive line 12 and the negative line 18. A coating of low work function electron emissive material may be provided on the spark gap electrodes of device 22 and a small amount of radioactive material may be positioned within its envelope to continuously ionize a portion of the gas in such device without causing the spark gap to break down at normal line voltage. These additional features increase the speed of response of the high voltage discharge device. Spark gap discharge device 22 may have a breakdown voltage of approximately 230 volts so that surge voltages above this magnitude will render such discharge device conducting to short circuit lines 12 and 18 which prevents such surge from reaching the load 16.

Once the gas has been ionized and a discharge produced across the spark gap within device 22 by a surge voltage above 230 volts, such gas can be maintained in a highly ionized condition by the relatively low voltage of D.C. voltage source 14 to cause continued discharge between the spark gap electrodes of such device after the surge voltage ends. In order to prevent this from happening, the contacts of relay 10 are momentarilty opened to interrupt the current flow through discharge device 22 and to cause such device to return to a nonconducting condition. In order to actuate relay 10, its solenoid winding 24 is connected in series with line 12 between the input of such line and a current limiting resistor 26 of about 0.13 ohm, whose other terminal is connected to spark gap discharge device 22. Thus when discharge device 22 is rendered conducting by a high voltage surge, the current flow through solenoid winding 24 increases sufficiently to actuate the relay 10, opening the contacts of such relay and interrupting the power to enable such discharge device to return to a nonconducting condition. When this happens the current through the solenoid coil 24 decreases to its normal value and de-energizes the relay causing its contacts to return to the normally closed position.

As a result of the above operation, the D.C. power transmitted to load 16 is only briefly interrupted.

A low voltage protection means including a controlled semiconductor rectifier 28, such as silicon controlled rectifier 2N1909, is connected between the conductor lines 12 and 18 after the high voltage protection device 22. This controlled rectifier prevents voltage surges less than the 230 volt breakdown level of device 22, but greater than the maximum permissible voltage that can be applied to the load circuit 16 without damage, from being transmitted to such load circuit. The anode of rectifier 28 is connected to the positive line 12, while the cathode of such rectifier is connected to the negative line 18, and the trigger electrode or gate of such rectifier is connected through a resistor 30 of about 8 kilohms to positive line 12. When the controlled rectifier 28 has a breakover or starting current of about 10 milliamperes, the minimum voltage difference between lines 12 and 18 sufficient to cause such rectifier to conduct is about 45 volts. Thus rectifier 28 is normally nonconducting and is only rendered conducting by voltage surges greater than 45 volts.

The silicon control rectifier is a PNPN semiconductor device having a high current capability on the order of 110 amperes continuously which operates in a similar manner to a thyratron in that once such device is rendered conducting it is maintained in such conducting condition by a much lower voltage. Thus the voltage of the D.C. supply 14 will maintain the silicon controlled rectifier 28 conducting after it has been rendered conducting by a high voltage surge. However, the relay 10 prevents this from happening, since the increased current flow through the solenoid winding 24 when rectifier 28 is rendered conducting is sufficient to actuate such relay. When this happens the relay contacts open briefly to terminate the flow of current through rectifier 28 for a sufficient time to return such rectifier to a nonconducting state. This reduces the current flow through winding 24 back to its normal value and de-energizes the relay 10, causing its contacts to close again. As a result the controlled rectifier low rectifier low voltage protection device only briefly interrupts the flow of D.C. current to the load circuit 16 when such rectifier is triggered by a voltage surge.

The low voltage protection means also includes a conventional PN junction diode 32, which may be of the 1N3493 type, having a continuous current capability of 18 amperes and a peak inverse voltage of 200 volts. The cathode of diode 32 is connected to the positive supply line 12, while the anode of such diode is connected to the negative line 18, so that such diode is normally reverse biased nonconducting by D.C. power supply 14. Diode 32 is thus connected in parallel with controlled rectifier 28 but of opposite polarity, and such diode protects against voltage surges of opposite polarity to that of the D.C. power supply 14. Thus a negative surge voltage of greater magnitude than the reverse bias voltage on diode 32 will render such diode conducting to prevent such voltage surge from reaching the load. It should be noted that unlike spark gap discharge device 22 and silicon controlled rectifier 28, the diode 32 immediately returns to its nonconducting state when the opposite polarity surge voltage ceases, since such diode is reverse biased by the D.C. power supply. Therefore, relay 10 need not be actuated to render diode 32 nonconducting and indeed the increased current flow will usually not be sufficient to enable solenoid coil 24 to actuate the relay. The use of diode 32 enables the use of a less expensive silicon controlled rectifier 28 having a lower peak inverse voltage, which may be on the order of 25 volts for the rectifier type given. In addition, such diode eliminates the necessity of providing a second silicon controlled rectifier connected in parallel but opposite in phase with that of rectifier 28.

An inductance 34, which may be in the form of approximately 100 turns of No. 16 wire about a ½ inch diameter core, is connected in series with line 12 between current limiting resistor 26 and the output of such line. This inductance together with a capacitor 36 of about 1500 microfarads connected in series with a resistance 38 of about 0.1 ohm between lines 12 and 18, form an oscillation suppression circuit which attenuates any transients or signal reflections such as that which may be formed when the contacts of relay 10 are opened and closed or when devices 22, 28 or 32 are rendered conducting or nonconducting. As a further protection, a fuse 40 may be connected in series with line 12 between relay 10 and current limiting resistor 26, such fuse having a D.C. current carrying capability limited to about 20 to 30 amperes.

Figure 2:
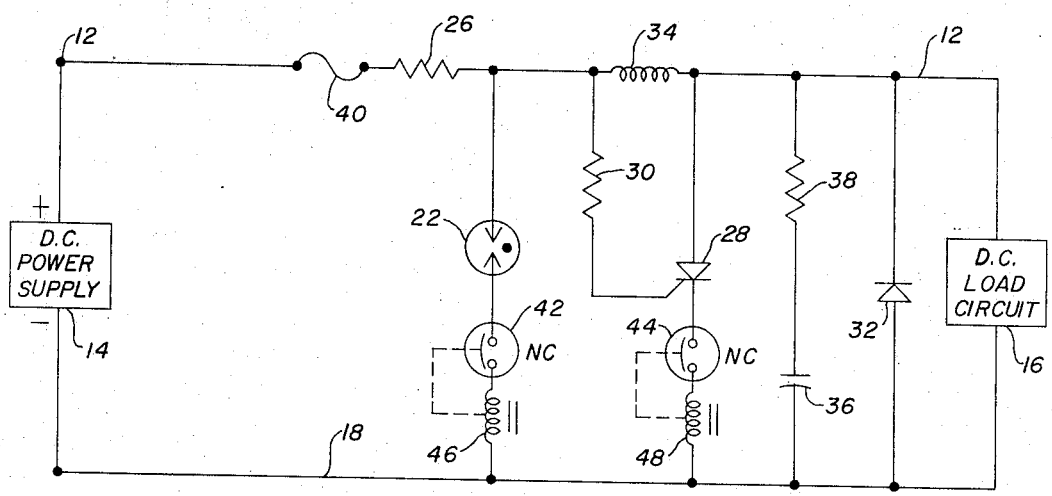
FIG. 2 is a schematic diagram of a second embodiment of the present invention.

Another embodiment of the present invention is shown in FIG. 2 and is very similar to that of FIG. 1 except for the use of two relays 42 and 44 and their respective solenoid windings 46 and 48, in place of the relay 10 and winding 24 of FIG. 1. The remainder of the surge protection circuit of FIG. 2 is the same as that of FIG. 1, so that similar reference numerals have been employed to designate the same components as in FIG. 1. The normally closed contacts of relay 42 are connected in series with the solenoid winding 46 and spark gap discharge device 22 between the conductor lines 12 and 18. Similarly the normally closed contacts of relay 44 are connected in series with the solenoid winding 48 and the controlled rectifier 28 between conductor lines 12 and 18. This arrangement of the relays 42 and 44 in parallel, rather than in series, with the load circuit 16 eliminates any power interruption to the load circuit when such relays are rendered momentarily nonconducting by the conduction of discharge device 22 or controlled rectifier 28 due to voltage surges. Thus, relays 42 and 44 function in a similar manner to relay 10 of FIG. 1 in that they enable the spark gap discharge device 22 and the controlled rectifier 28 respectively to be returned to their nonconductive condition after the termination of the high voltage surges, rendering them conducting. It should be noted that the circuit of FIG. 2 is an improvement over that of FIG. 1 because it eliminates any interruption of the D.C. power supplied to the load circuit when the relays are energized.

By employing a silicon controlled rectifier as a low voltage protection device, the surge protection circuit of the present invention has a faster response time and a much greater current capacity than previous circuits of this type employing Zener diodes, such as that shown in United States Patent 2,789,254 of Bodle et al. In addition, the use of a conventional PN junction diode in parallel with such silicon controlled rectifier further simplifies and reduces the cost of the present circuit over that of such previous circuits of similar capability.

It will be obvious to those having ordinary skill in the art that many changes may be made in the details of the above preferred embodiments of the present invention without departing from the spirit of the invention. For example, other types of switches or relays can be employed in place of the vacuum relays 10, 42 and 44, a conventional high voltage discharge device can be substituted for device 22, such conventional device not being maintained in conduction by the D.C. supply voltage, so that relay 42 of FIG. 2 would be necessary. Therefore, the scope of the present invention should only be determined by the following claims.

I claim:
1. An overvoltage surge protection circuit, comprising:
   a pair of conductor lines adapted to be connected between a voltage source and a load;
   normally conducting switch means connected to at least one of said lines;
   high voltage protection means including a discharge device connected between said lines, said device being adapted to be rendered conducting when the surge voltage on said conductors is above a first voltage;
   low voltage protection means including a controlled semiconductor rectifier having an anode, a cathode and a trigger electrode with its anode and cathode connected to different ones of said pair of lines in position between said discharge device and the outputs of said lines;

means connecting one of said lines to the trigger electrode of said controlled rectifier to enable said controlled rectifier to be rendered conducting when the surge voltage on such line is above a second voltage less than said first voltage; and means for actuating said switch means to render it nonconducting in response to the conduction of said controlled rectifier to interrupt the current flow through said rectifier and return it to a nonconducting condition.

2. An overvoltage surge protection circuit, comprising:
a pair of conductor lines adapted to be connected between a D.C. voltage source and a load;
a normally conducting switch means connected to one of said lines;
high voltage protection means including a gas discharge device connected between said lines, said device being adapted to be rendered conducting when the surge voltage on said conductors is above a first voltage;
low voltage protection means including a controlled semiconductor rectifier having an anode, a cathode and a trigger electrode with its anode and cathode connected to different ones of said pair of lines in position between said discharge device and the outputs of said lines;
means connecting one of said lines to the trigger electrode of said controlled rectifier to enable said controlled rectifier to be rendered conducting when the surge voltage on such line is above a second voltage much less than said first voltage;
at least one semiconductor diode connected between said pair of lines with a polarity opposite that of said controlled rectifier so that said diode is normally nonconductive and is positioned between said discharge device and the output of said lines; and
means for actuating said switch means to render it briefly nonconducting in response to the conduction of either said discharge device or said controlled rectifier protection devices to interrupt the current flow through the conducting protection device and return it to a nonconducting condition.

3. An overvoltage surge protection circuit, comprising:
a pair of conductor lines adapted to be connected between a D.C. voltage source and a load;
a normally conducting relay connected in series with one of said lines;
high voltage protection means including a spark gap gas discharge device connected between said lines, said device being adapted to be rendered conducting when the surge voltage on said conductors is above a first voltage;
a current limiting resistor connected in series with one of said lines between said discharge device and the input of such lines;
low voltage protection means including a controlled semiconductor rectifier having an anode, a cathode and a trigger electrode with its anode and cathode connected to different ones of said pair of lines in position between said discharge device and the outputs of said lines;
means connecting one of said lines to the trigger electrode of said controlled rectifier to enable said controlled rectifier to be rendered conducting when the surge voltage on such line is above a second voltage much less than said first voltage;
at least one semiconductor diode connected between said pair of lines with a polarity opposite that of said controlled rectifier so that said diode is normally nonconductive and is positioned between said discharge device and the output of said lines; and means for actuating said relay to render it briefly nonconducting to interrupt the current flow to said load in response to the conduction of either of said discharge device or said controlled rectifier protection devices to return the conducting protection device to a nonconducting condition.

4. An overvoltage surge protection circuit, comprising:
a pair of conductor lines adapted to be connected between a D.C. voltage source and a load;
a relay having normally closed contacts connected in series with one of said lines;
high voltage protection means including a spark gap discharge device connected between said lines, said device including an envelope containing a gas at subatmospheric pressure and at least two spaced spark gap electrodes and adapted to be rendered conducting when the surge voltage on said conductors is above a first voltage;
low voltage protection means including a controlled semiconductor rectifier having an anode, a cathode and a trigger electrode with its anode connected to the positive voltage line and cathode connected to the negative voltage line of said pair of lines in position between said discharge device and the outputs of said lines;
means connecting one of said lines to the trigger electrode of said controlled rectifier to enable said controlled rectifier to be rendered conducting when the surge voltage on such line is above a second voltage much less than said first voltage;
at least one semiconductor diode connected between said pair of lines with a polarity opposite that of said controlled rectifier so that said diode is normally reverse biased nonconductive by said D.C. voltage source and is positioned between said discharge device and the output of said lines; and
electromagnetic coil means for actuating said relay to render it briefly nonconducting to interrupt the current flow to said load in response to the conduction of any one of said discharge device, said controlled rectifier and said diode protection devices to return the conducting protection device to a nonconducting condition.

5. An overvoltage surge protection circuit, comprising:
a pair of conductor lines adapted to be connected between a D.C. voltage source and a load;
a relay having normally closed contacts connected in series with one of said lines;
a spark gap discharge device connected between said lines, said device including an envelope containing a gas at subatmospheric pressure and a pair of spaced spark gap electrodes, and adapted to be rendered conducting when the surge voltage on said conductors is above a first voltage;
a current limiting resistor connected in series with one of said lines between said discharge device and the input of such lines;
a controlled semiconductor rectifier having an anode, a cathode and a trigger electrode with its anode connected to the positive voltage line and cathode connected to the negative voltage line of said pair of lines in position between said discharge device and the outputs of said lines;
a second resistor connected between one of said lines and the trigger electrode of said controlled rectifier to enable said controlled rectifier to be rendered conducting when the surge voltage on such line is above a second voltage much less than said first voltage;
an inductance connected in series with said one line between said second resistor and the anode of said controlled rectifier;
a capacitor having one terminal connected to the other of said lines;
a third resistor connected between the other terminal of said capacitor and said one line;

at least one semiconductor diode connected between said pair of lines with a polarity opposite that of said controlled rectifier so that said diode is normally reverse biased nonconductive by said D.C. voltage source and is positioned between said discharge device and the output of said lines; and means including an electromagnetic coil connected in series with one of said lines between its input and said discharge device, for actuating said relay to render it nonconducting to interrupt the current flow to said load in response to the conduction of said discharge device or said controlled rectifier protection devices to return the conducting protection device to a nonconducting condition.

6. An overvoltage surge protection circuit, comprising:

a pair of conductor lines adapted to be connected between a D.C. voltage source and a load;

a spark gap discharge device connected between said lines, said device including an envelope containing a gas at subatmospheric pressure and a pair of spark gap electrodes adapted to be rendered conducting when the surge voltage on said conductors is above a first voltage;

a first resistor connected in series with one of said lines between said discharge device and the input of such line;

a controlled semiconductor rectifier having an anode, a cathode and a trigger electrode with its anode connected to the positive voltage line and cathode connected to the negative voltage line of said pair of lines in position between said discharge device and the outputs of said lines;

a second resistor connected between one of said lines and the trigger electrode of said controlled rectifier to enable said controlled rectifier to be rendered conducting when the surge voltage on such line is above a second voltage much less than said first voltage;

a pair of normally conducting relays each connected in series with a different one of said discharge device and said controlled rectifier between said lines;

at least one semiconductor diode connected between said pair of lines with a polarity opposite that of said controlled rectifier so that said diode is normally reverse biased nonconductive by said D.C. voltage source and is positioned between said discharge device and the output of said lines; and means for actuating said relays to render them nonconducting in response to the conduction of said discharge device and said controlled rectifier in order to return said discharge device and said controlled rectifier to a nonconducting condition.

References Cited

UNITED STATES PATENTS

| | | | |
|---|---|---|---|
| 2,789,254 | 4/1957 | Bodle et al. | 317—33 X |
| 3,253,189 | 5/1966 | Wouk | 317—33 X |
| 3,317,792 | 5/1967 | Sutherland | 317—31 |
| 3,325,718 | 6/1967 | McNulty | 317—33 X |

FOREIGN PATENTS 1,300,021   6/1962   France.

MILTON O. HIRSHFIELD, *Primary Examiner.*

J. D. TRAMMELL, *Assistant Examiner.*

UNITED STATES PATENT OFFICE

CERTIFICATE OF CORRECTION

Patent No. 3,353,066                        November 14, 1967

Alwyn A. de Souza

It is hereby certified that error appears in the above numbered patent requiring correction and that the said Letters Patent should read as corrected below.

Column 1, line 36, for "devices" read -- device --; column 2, line 19, for "diagrem" read -- diagram --; line 24, for "Unitet" read -- United --; line 56, for "momentarilty" read -- momentarily --; column 3, line 40, strike out "rectifier low", second occurrence; column 4, line 61, for "necessary" read -- unnecessary --; column 6, line 3, strike out "of", second occurrence.

Signed and sealed this 3rd day of December 1968.

(SEAL)
Attest:

Edward M. Fletcher, Jr.                           EDWARD J. BRENNER
Attesting Officer                                      Commissioner of Patents